US012719404B2

(12) United States Patent
Shin

(10) Patent No.: US 12,719,404 B2
(45) Date of Patent: Aug. 25, 2026

(54) SOLAR ROTATING DEVICE WITH ANTI-SHAKING STRUCTURE

(71) Applicant: REEL TECH CO., LTD., Suncheon-si (KR)

(72) Inventor: Jeong Hoon Shin, Suncheon-si (KR)

(73) Assignee: REEL TECH CO., LTD., Suncheon-si (KR)

( * ) Notice: Subject to any disclaimer, the term of this patent is extended or adjusted under 35 U.S.C. 154(b) by 0 days.

(21) Appl. No.: 18/725,142

(22) PCT Filed: Nov. 30, 2022

(86) PCT No.: PCT/KR2022/019136
§ 371 (c)(1),
(2) Date: Jun. 28, 2024

(87) PCT Pub. No.: WO2023/136468
PCT Pub. Date: Jul. 20, 2023

(65) Prior Publication Data

US 2025/0175118 A1 May 29, 2025

(30) Foreign Application Priority Data

Jan. 14, 2022 (KR) ........................ 10-2022-0006224

(51) Int. Cl.
*H02S 20/32* (2014.01)
*F16H 1/28* (2006.01)
(Continued)

(52) U.S. Cl.
CPC ........... *H02S 20/32* (2014.12); *F16H 1/2854* (2013.01); *F16H 1/2863* (2013.01); *F16H 1/46* (2013.01); *H02S 20/10* (2014.12)

(58) Field of Classification Search
CPC .......... H02S 20/32; H02S 20/10; H02S 20/30; H02S 30/10; F16H 1/2854; F16H 1/2863; F16H 1/46; Y02E 10/50
(Continued)

(56) References Cited

U.S. PATENT DOCUMENTS 3,757,608 A * 9/1973 Willner ................ F16H 1/2809 74/411
9,509,248 B2 * 11/2016 Wu ...................... F16H 57/022
(Continued)

FOREIGN PATENT DOCUMENTS

JP 2012039130 A 2/2012
KR 20110024887 A 3/2011
(Continued)

OTHER PUBLICATIONS

International Search Report mailed Mar. 8, 2023 for PCT/KR2022/019136, citing the above reference(s).

*Primary Examiner* — Muhammad Ijaz
(74) *Attorney, Agent, or Firm* — CANTOR COLBURN LLP

(57) ABSTRACT

Disclosed is a solar rotating device with anti-shaking structure, characterized in that the solar rotating device comprises a first planetary gear set and a second planetary gear set disposed at a next stage of the first planetary gear set, and inclined teeth are formed on at least a peripheral surface of a second PL gear and a second ring gear of the second planetary gear set to have tapered structures.

5 Claims, 8 Drawing Sheets

(51) Int. Cl.
*F16H 1/46* (2006.01)
*H02S 20/10* (2014.01)

(58) Field of Classification Search
USPC ........................................................ 248/125.7
See application file for complete search history.

(56) References Cited

U.S. PATENT DOCUMENTS

| | | | | |
|---|---|---|---|---|
| 9,574,637 | B2 * | 2/2017 | Hansson | F16H 1/28 |
| 11,131,364 | B2 * | 9/2021 | Ho | H02K 7/1166 |
| 11,298,817 | B2 * | 4/2022 | Damerau | F16H 1/2836 |
| 11,614,146 | B2 * | 3/2023 | Lettow | F16H 57/082 475/331 |
| 11,953,078 | B1 * | 4/2024 | Tsai | F16H 57/08 |
| 2003/0232692 | A1 * | 12/2003 | Chen | F16H 3/74 475/331 |
| 2005/0284468 | A1 * | 12/2005 | Pawlenko | F24S 30/452 126/605 |
| 2008/0182708 | A1 * | 7/2008 | Kato | F16H 1/2863 475/347 |
| 2009/0107484 | A1 * | 4/2009 | Bender | F24S 25/50 126/569 |
| 2011/0017259 | A1 * | 1/2011 | Mann | H02S 20/00 248/122.1 |
| 2011/0036388 | A1 * | 2/2011 | Yoshida | H02S 20/32 136/246 |
| 2012/0279550 | A1 * | 11/2012 | Noble | H02S 20/32 136/246 |
| 2015/0316639 | A1 * | 11/2015 | Russ | H02S 20/10 250/203.4 |
| 2016/0017957 | A1 * | 1/2016 | Graybar | F16H 57/082 475/149 |
| 2016/0072427 | A1 * | 3/2016 | Wu | F16H 1/16 74/380 |
| 2016/0091053 | A1 * | 3/2016 | Hansson | F16H 1/2863 475/346 |
| 2017/0254389 | A1 * | 9/2017 | Lau | F16H 57/027 |
| 2018/0131315 | A1 * | 5/2018 | Tromley | H02S 30/00 |
| 2018/0172112 | A1 * | 6/2018 | Hansson | F16H 1/2809 |
| 2018/0306277 | A1 * | 10/2018 | Gibb | F16H 1/32 |
| 2022/0085751 | A1 * | 3/2022 | Shin | F21S 8/085 |
| 2023/0126713 | A1 * | 4/2023 | Shin | F24S 30/422 136/246 |
| 2024/0039458 | A1 * | 2/2024 | Shin | F16H 1/2854 |
| 2025/0175118 | A1 * | 5/2025 | Shin | H02S 20/30 |
| 2025/0198496 | A1 * | 6/2025 | Ai | F16H 1/46 |

FOREIGN PATENT DOCUMENTS

| | | | |
|---|---|---|---|
| KR | 101053982 | B1 | 8/2011 |
| KR | 20140132032 | A | 11/2014 |
| KR | 20160086729 | A | 7/2016 |
| KR | 20210140890 | A | 11/2021 |

* cited by examiner

SOLAR ROTATING DEVICE WITH ANTI-SHAKING STRUCTURE

TECHNICAL FIELD

This application claims priority based on Korean Patent Application No. 10-2022-0006224 filed on Jan. 14, 2022 in the Republic of Korea, and all disclosures of the specification and drawings of the application are incorporated herein.

The present invention relates to a solar rotating device having an anti-shaking structure, and more specifically, to a solar rotating device having an anti-shaking structure that is installed on a pole and provides rotational force to a solar panel.

BACKGROUND ART

In general, solar power generation systems are built in a complex form with multiple solar panels gathered on sites such as forests, fallow land, building roofs, reservoirs, or salt farms.

If the site for solar power generation is a forest or farmland, the frame structure and solar panels must be installed after clearing the site by felling or civil engineering work, which inevitably causes environmental damage due to large-scale damage to trees and soil. Due to these side effects, it is not easy to use the forests etc. as solar power generation sites even if they meet location conditions required for solar power generation.

Korean Patent Publication No. 2011-0024887A discloses a self-weight solar power generation device that can be installed in a non-destructive manner in places such as a building rooftop or embankment. The self-weight solar power generation device includes a pillar assembly having at least one pillar connected in succession, and a light collecting panel coupled to the upper part of the pillar assembly, wherein the pillar is provided with an inclined surface on the upper surface thereof and an inner space to accommodate a filling material therein.

Korean Patent Publication No. 2016-0086729A relates to a method of installing photovoltaic modules without occupying paddy fields or fields, and provides photovoltaic modules and methods so that photovoltaic modules can be easily installed on paddy fields or fields during an agricultural off-season after a harvest is over. The modules and methods have a lower support, an installation fixing frame and a support frame.

In addition, Korean Patent Publication No. 2016-0086729A discloses a solar module with a hinge structure connected to one side of the installation fixing frame of an easy-construction solar module and one side of a protection frame of another easy-construction solar module, so that a plurality of the easy-construction solar modules are provided in an folded manner and can be unfolded when used.

However, in the conventional solar power generation system, the area occupied by the frame structure supporting the solar panel is large, so there is still a problem of serious damage to nature during construction, so an alternative is required.

In addition, conventional solar power generation systems have a disadvantage of low solar power generation efficiency because solar panels are usually fixedly installed. Although a system for tracking a movement of the sun and moving solar panels for solar power generation has been disclosed, the system is complex and expensive, making it difficult to build the system.

In order to increase the efficiency of solar power generation, it is desirable to rotate the solar panel along a designated path considering an amount of sunlight. However, if the solar panel is placed on a top of a pole and a rotation shaft of a drive motor is simply connected to the solar panel to rotate it, the rotation shaft of the drive motor may be overloaded, and if an external force such as wind is applied, the rotation shaft and the solar panel may be twisted or damaged, and disconnection of wiring at the rotating part may occur, which require some measures.

In addition, when wind is applied to the solar panel, the solar panel may be shaken due to a backlash present in a gear assembly installed between the drive motor and the solar panel, and in severe cases, the gear assembly is damaged to cause the solar panel to fall.

DISCLOSURE

Technical Goal

The present invention was created in consideration of the above problems, and its object is to provide a solar rotating device with an anti-shaking structure that prevent unnecessary backlash from occurring in the gear assembly provided in the rotating device.

Another object of the present invention is to provide a solar rotating device with an anti-shaking structure that solves problems of twist or damage of a connection part between the rotating device and the solar panel due to external forces such as wind and a disconnection of a wiring at the rotating part.

Technical Solution

In order to achieve the above object, the present invention includes a first tubular body connected to a solar panel array: a second tubular body coupled to a lower part of the first tubular body and fixed to an upper end of a pole: a gear unit including at least two planetary gear sets and transmitting a reduced rotational force to the first tubular body; and a drive motor fixed to an inside of the second tubular body to provide the rotational force to the gear unit.

The gear unit comprises a first planetary gear set and a second planetary gear set.

The first planetary gear set includes a first sun gear that receives the rotational force generated by the drive motor, a plurality of first PL gears arranged and engaged around the first sun gear at predetermined intervals, and a first ring gear engaged outside of the plurality of first PL gears.

The second planetary gear set is disposed at a next stage of the first planetary gear set to receive the rotational force. The second planetary gear set includes a second sun gear, a plurality of second PL gears disposed and engaged at predetermined intervals around the second sun gear, and a second ring gear engaged outside of the plurality of second PL gears and outputting a reduced rotational force to the first tubular body.

Inclined teeth are formed on peripheral surfaces of at least the second PL gear and the second ring gear to have tapered structures.

The inclined teeth are formed on an outer peripheral surface of the second sun gear, an outer peripheral surface of the second PL gear, and an inner peripheral surface of the second ring gear, so that a predetermined clearance is secured on the gear contact surfaces during rotation, and when the rotation ends, the tapered structure allows the gear contact surfaces to closely engaged with each other to prevent backlash.

When the rotation ends, force is applied to the plurality of second PL gears due to their own weight in a direction in which they are inserted between the second sun gear and the second ring gear.

The first ring gear and the second ring gear are each composed of an assembly of an upper ring gear and a lower ring gear.

The first ring gear and the second sun gear are connected, or the first ring gear and a portion of a carrier of the second PL gear is connected to transmit the rotational force from the first planetary gear set to the second planetary gear set.

According to another aspect of the present invention, multi-stage composite gear assembly used in a solar rotating device that rotates a solar panel array comprises a first planetary gear set and a second planetary gear set.

The first planetary gear set comprises a first sun gear that receives a rotational force generated from a drive motor, a plurality of first PL gears arranged at predetermined intervals around the first sun gear to be engaged to the first sun gear, and a first ring gear disposed and engaged outside of the plurality of first PL gears.

The second planetary gear set is disposed at a next stage of the first planetary gear set to receive the rotational force. The second planetary gear set comprises a second sun gear, a plurality of second PL gears disposed and engaged at predetermined intervals around the second sun gear, and a second ring gear meshed on an outside of the plurality of second PL gears and outputting a reduced rotational force.

Inclined teeth are formed on peripheral surfaces of at least the second PL gear and the second ring gear to have a tapered structure.

Advantageous Effects

The solar rotating device with an anti-shaking structure according to the present invention has the following effects.

First, a sufficient reduction ratio is secured by a multi-stage composite gear assembly, and an appropriate clearance (backlash) required for rotation is generated at contact surfaces between the gears, and when the rotation ends, shaking of the solar panel due to wind, etc. is prevented by close contacts between the second PL gear, the second sun gear, and the second ring gear due to tapered structures to prevent backlash from occurring.

Second, by a bearing and an assembly of the first tubular body and the second tubular body, the solar panel array installed on the pole is firmly supported, and at the same time, rotational force is stably transmitted without shaking caused by external forces such as various vibrations or wind.

Third, even if diameters of the first tubular body and the second tubular body are designed to be the same or similar to the diameter of the pole, smooth rotation is achieved by a bearing interposed between the first tubular body and the second tubular body, and precise rotation control in seconds is possible.

Fourth, since the rotation device can be miniaturized and has a simple configuration, an investment cost can be recovered quickly to solve a frequent failure rate and high price problems that were disadvantages of conventional solar tracking devices.

Fifth, because the solar panel is supported by a pole, the solar panel is sufficiently spaced from a ground and ventilation is enough, thereby suppressing a temperature rise of the solar panel and increasing a solar power generation efficiency.

Sixth, if a solar power generation site is a mountainous area or forest, trees around the poles that support the solar panels can be maintained to minimize damage to nature.

BEST MODE

Figure 1:
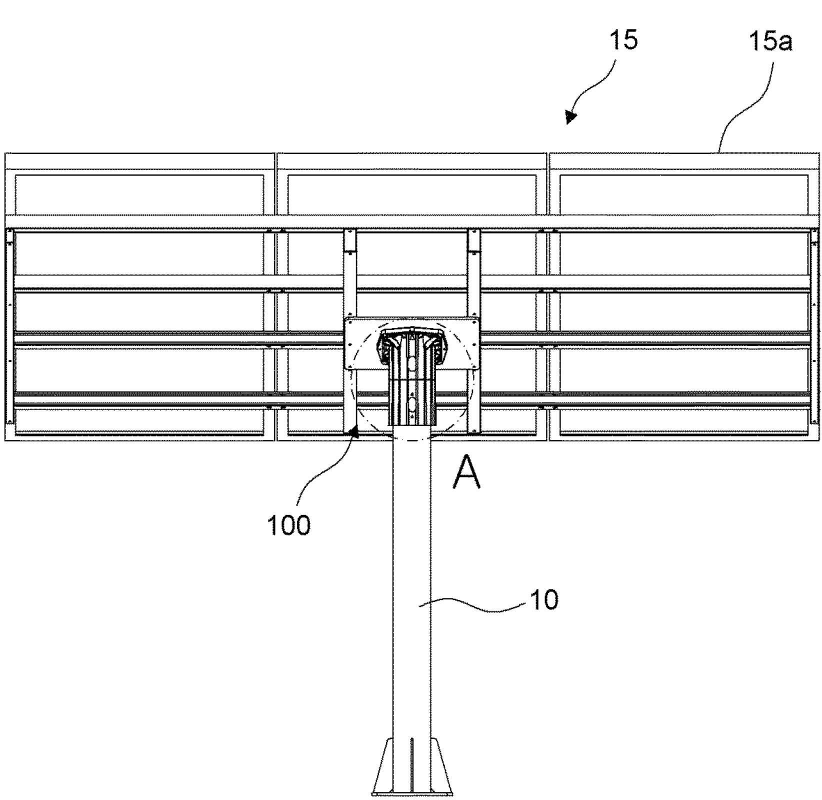
FIG. 1 is a rear perspective view showing an exterior of a solar rotating device with an anti-shaking structure according to a preferred embodiment of the present invention.
Figure 2:
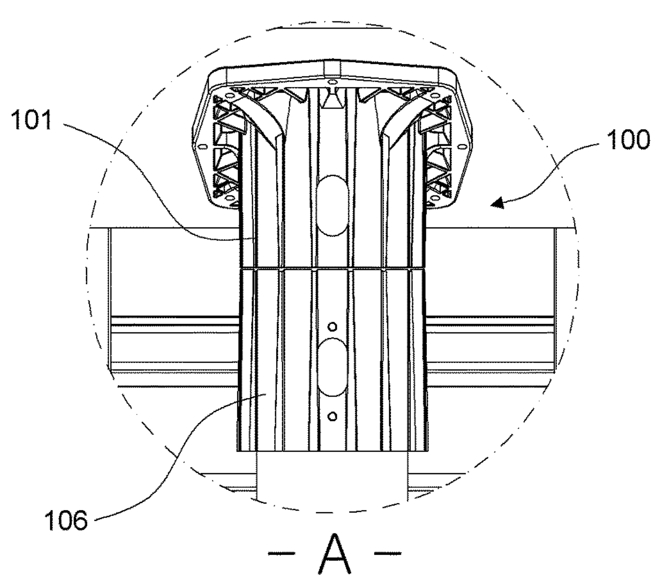
FIG. 2 is a partial enlarged view of the rotating device of FIG. 1.
Figure 3:
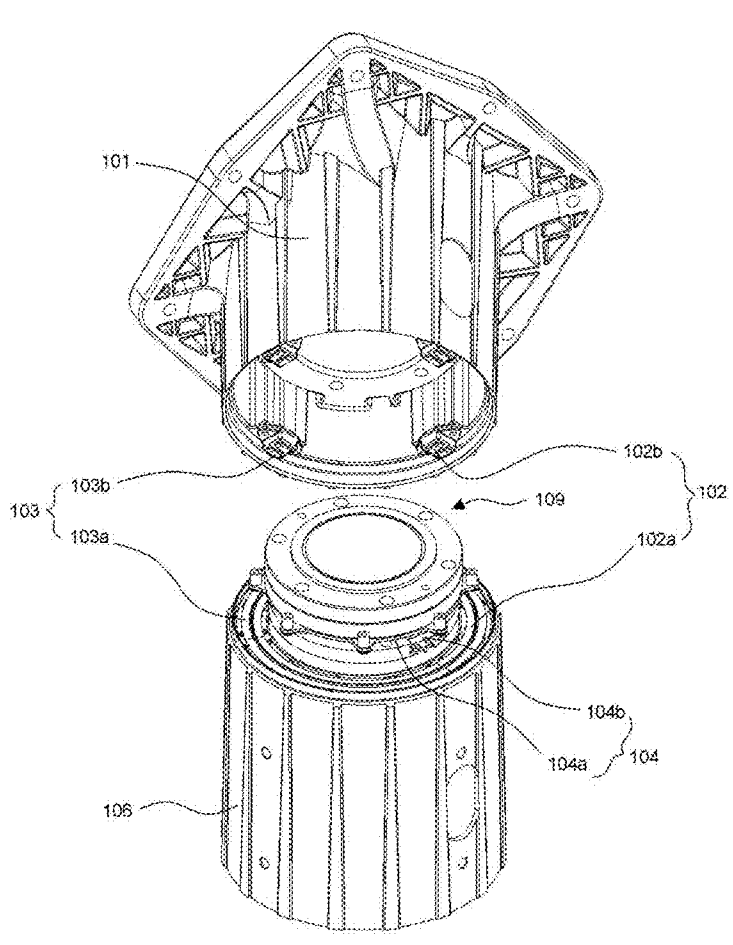
FIG. 3 is an exploded perspective view showing an internal configuration of the rotating device of FIG. 2.
Figure 4:
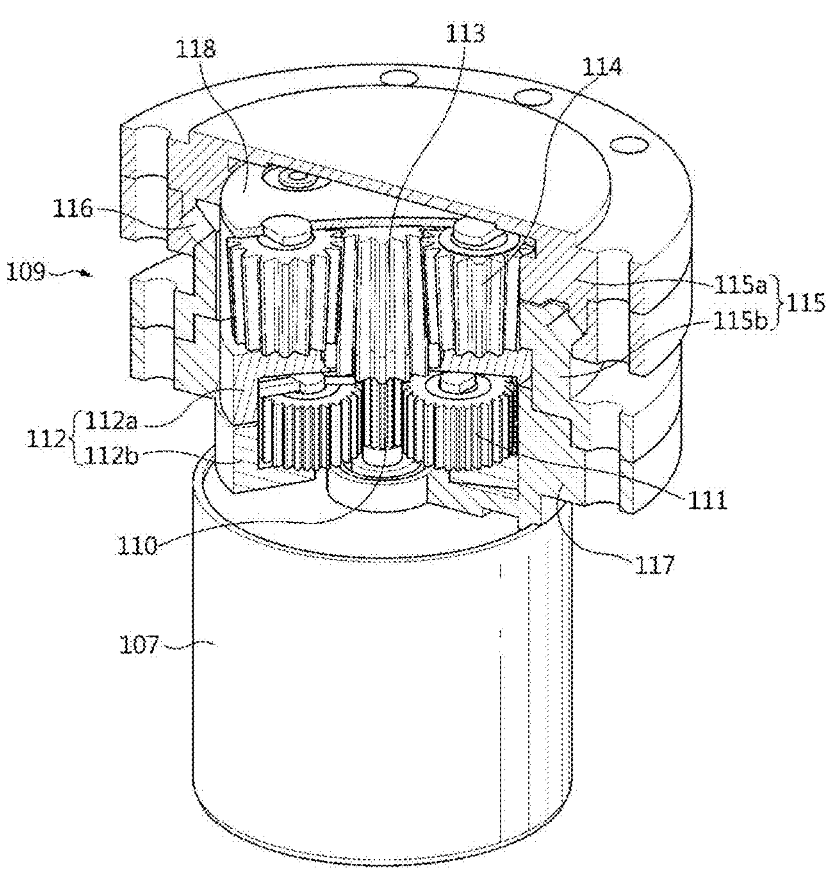
FIG. 4 is a partially cut-away perspective view showing a configuration of a gear unit and a drive motor of FIG. 3.

FIG. 1 is a rear perspective view showing an exterior of a solar rotating device with an anti-shaking structure according to a preferred embodiment of the present invention, FIG. 2 is a partial enlarged view of the rotating device of FIG. 1, FIG. 3 is an exploded perspective view showing an internal structure of the rotating device of FIG. 2, and FIG. 4 is a partially cut-away perspective view showing a structure of the gear unit and the drive motor of FIG. 3.

Referring to FIGS. 1 to 4, the solar rotating device 100 with an anti-shaking structure according to a preferred embodiment of the present invention includes a first tubular body 101 connected to a back of the solar panel array 15, a second tubular body 106 assembled to the lower part of the first tubular body 101 and the lower end thereof is fixed to the pole 10, a drive motor 107 installed in the second tubular body 106 to provide a rotational force to the first tubular body 101, and a gear unit 109 that transmits the rotational force provided from the drive motor 107 to the first tubular body 101. Preferably, it includes contact point portions 102, 103, and 104 having at least three contact points provided at a connection portion of the first tubular body 101 and the second tubular body 106.

The solar panel array 15 is composed of a plurality of solar panels **15*a*** connected in series.

The solar panel array 15 is mounted on an inclined surface formed at a top of the first tubular body 101 to be installed at an angle with respect to the ground. The installation angle of the solar panel array 15 is determined by the angle of the inclined plane.

The pole 10 is installed vertically from the ground and its lower end is fixed to the ground by a fastening means such as an anchor bolt. Preferably, the pole 10 may be made of a metal tubular body having a round outer circumference like a typical street light pole, or may be made of various materials and shapes.

The first tubular body 101 is a pipe-shaped structure with a waterproof cover 105 provided on the inclined upper surface thereof and a circular peripheral surface. The waterproof cover 105 is detachably fastened to open and close an internal space of the first tubular body 101.

The second tubular body 106 is assembled to be positioned below the first tubular body 101 and is a pipe-shaped structure with a circular peripheral surface. A space is provided at the bottom of the second tubular body 106 into which a top part of the pole 10 can be inserted. As the pole 10 is inserted, the second tubular body 106 is fixed to the top of the pole.

In order to improve a coupling between the rotating device 100 and the pole 10, and to form a structurally stable assembly, diameters of the first tubular body 101 and the second tubular body 106 are the same or similar to a diameter of the pole.

A gear unit 109 including a predetermined bearing (see 116 in FIG. 5) is interposed between the first tubular body 101 and the second tubular body 106.

The gear unit 109 is configured by a multi-stage composite gear assembly including at least two planetary gear sets to decelerate the rotational force provided by the drive motor 107 at a sufficient rate and transmitting it to the first tubular body 101. Hereinafter, the configurations of the invention will be described based on an embodiment in which the gear unit 109 is composed of an assembly of two-stage planetary gear sets.

The gear unit 109 includes a first planetary gear set that receives the rotational force provided from the rotation shaft of the drive motor 107 and a second planetary gear set assembled at a next stage of the first planetary gear set. Here, when the gear unit 109 includes three or more planetary gear sets, an additional planetary gear set is disposed in front of the first planetary gear set.

Figure 5:
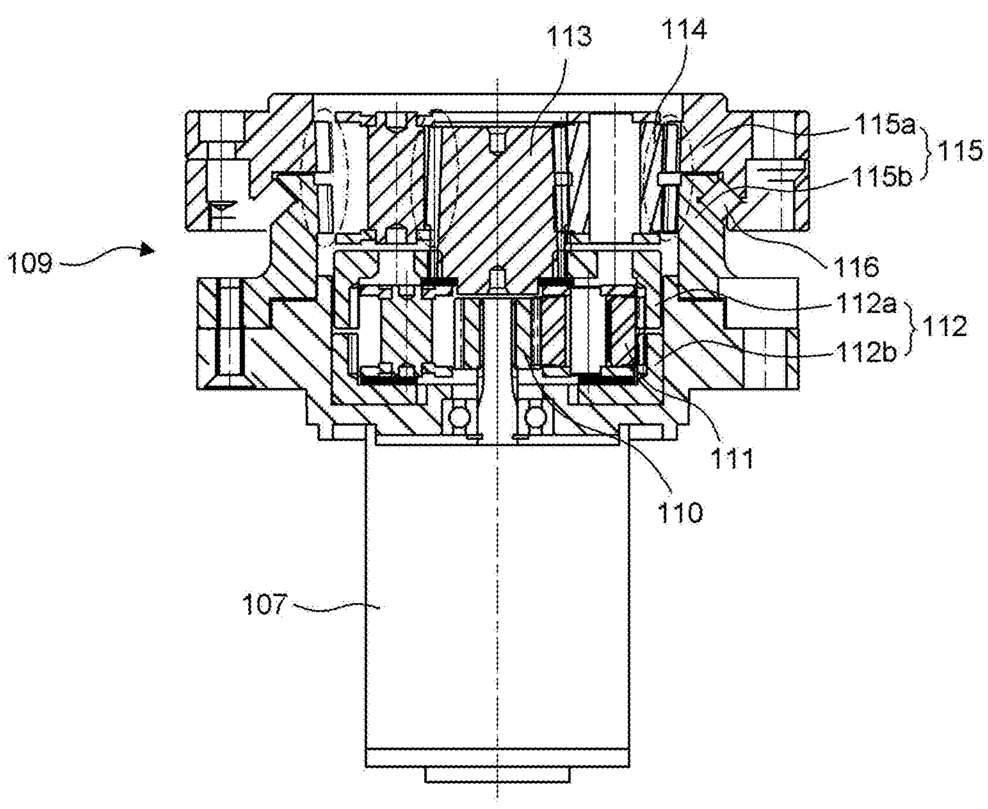
FIG. 5 is a partial cross-sectional view showing a configuration of the gear unit of FIG. 4.

As shown in FIGS. 4 and 5, the first planetary gear set includes a first sun gear 110 that is substantially connected to the rotation shaft of the drive motor 107 and receives rotational force, plurality of the first PL gears (planetary gears) 111 arranged at predetermined intervals around the first sun gear 110 to be engaged to the first sun gear 110, a first ring gear 112 disposed and engaged outside of the plurality of the first PL gears 111, and a motor cover 117 surrounding the first ring gear 112. Here, when the gear unit 109 includes, for example, a planetary gear set of three or more stages, a ring gear (not shown) provided on another planetary gear set located at the front of the first planetary gear set is connected to the first sun gear 110 to transmit the rotational force.

The second planetary gear set includes a second sun gear 113 that is connected to the first ring gear 112 to receive the rotational force, a plurality of second PL gear 114 arranged and engaged at predetermined intervals around the second sun gear 113, a second ring gear 115 engaged with an outside of the plurality of second PL gears 114 and fixed to the first tubular body 101, and a cross roller bearing 116 interposed in the second ring gear 115. The lower part of the second sun gear 113 is inserted and fixed to the first ring gear 112 to rotate integrally with the first ring gear 112 and receive rotational force. As an alternative, it is possible for a part (for example, carrier pin) of a carrier 118 that holds the plurality of second PL gears 114 to be connected to the first ring gear 112 to receive the rotational force. In this case, there may be a modified example in which the second sun gear 113 is omitted.

Both the first ring gear 112 and the second ring gear 115 may all be composed of an assembly of upper ring gears **112*a*, 115*a* and lower ring gears 112*b*, 115*b***.

Since the second planetary gear set outputs the reduced rotational force to the first tubular body 101, inclined teeth are formed on peripheral surfaces of at least the second PL gears 114 and the second ring gear 115 to form tapered structures. (see oval in FIG. 5). Most preferably, as shown in FIGS. 4 and 5, inclined teeth at a predetermined pitch are formed to provide tapered structures along the outer peripheral surface of the second sun gear 113, the outer peripheral surface of the second PL gear 114, and the inner peripheral surface of the second ring gear 115. More specifically, the second sun gear 113 has a cross section with a narrow upper part and a wide lower part, the second PL gears 114 have a cross section with a wide upper part and a narrow lower part, an inner diameter of an upper part of the second ring gear 115 is wider than an inner diameter of a lower part of the second ring gear 115 to correspond to an inclined surface of the second PL gears 114. In this case, the second sun gear 113 is composed of a first part with a taper and a second part without a taper that is fitted and fixed to the first ring gear 112. According to the configurations in which the tapered structures are formed in this way, when the planetary gear set rotates, a predetermined clearance necessary for smooth rotation is secured for the gear contact surfaces of the second sun gear 113, the second PL gear 114, and the second ring gear 115, and if the rotation ends, the gears 113 to 115 return to their original positions by their own weight and come into close contact with each other due to the tapered structures, thereby efficiently suppressing an occurrence of unnecessary backlash. A spring that provides elastic force may be added to one side of the gear unit 109 so that the gears 113 to 115 return more quickly when the rotation ends.

The tapered structures as described above must be formed at least at the contact portion between the second PL gear 114 and the second ring gear 115 to achieve an effect of preventing the rotating device 100 from shaking due to external forces such as wind. When the second sun gear 113 also has the tapered structure, the second PL gears 114 are stably supported by the second sun gear 113 located at its center, so that shaking of the rotating device due to external force can be more effectively prevented.

When a predetermined backlash of the order of a few millimeters is required on the contact surfaces between the gears 113 to 115 when the second planetary gear set rotates, the plurality of second PL gears 114 move slightly upward while overcoming their own weight by rotational force to provide backlash required for smooth movement. Meanwhile, when the rotation of the second planetary gear set ends, the plurality of second PL gears 114 return to their original positions by their own weight and are closely engaged with the second sun gear 113 and the second ring gear 115 through the tapered structures. Since the rotating device 100 is prevented from shaking due to external forces such as wind through the tapered structure, and thus the solar panel array 15 can be prevented from shaking.

Figure 6:
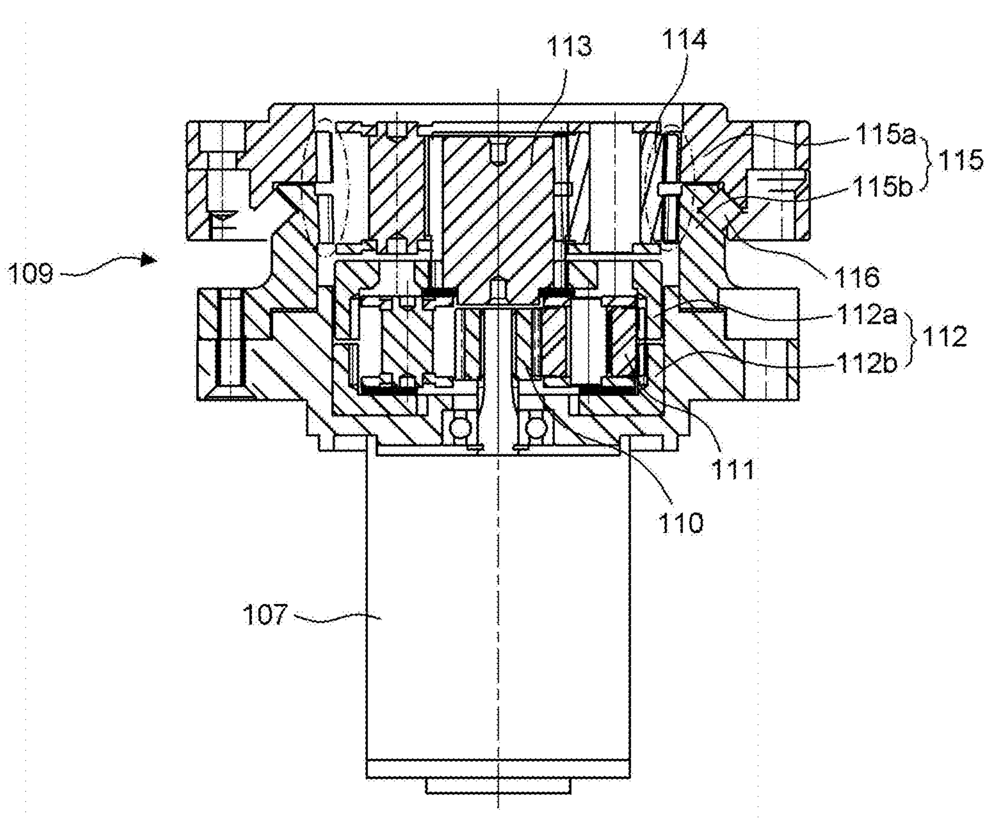
FIGS. 6 to 8 are cross-sectional views showing a modified example of FIG. 5.

According to a modified example of the present invention, various combinations are possible for the tapered structures of the second sun gear 113, the second PL gear 114, and the second ring gear 115. Specifically, as shown in FIG. 6, the inclined teeth forming the tapered structures are formed only on the outer peripheral surface of the second PL gear 114 and the inner peripheral surface of the second ring gear 115, and teeth without the tapered structure are formed on the outer peripheral surface of the second sun gear 113. At this time, the upper second ring gear **115*a* and the lower second ring gear 115*b* forming the second ring gear 115 have different inner diameters corresponding to the inclined surface of the second PL gears 114**.

Figure 7:
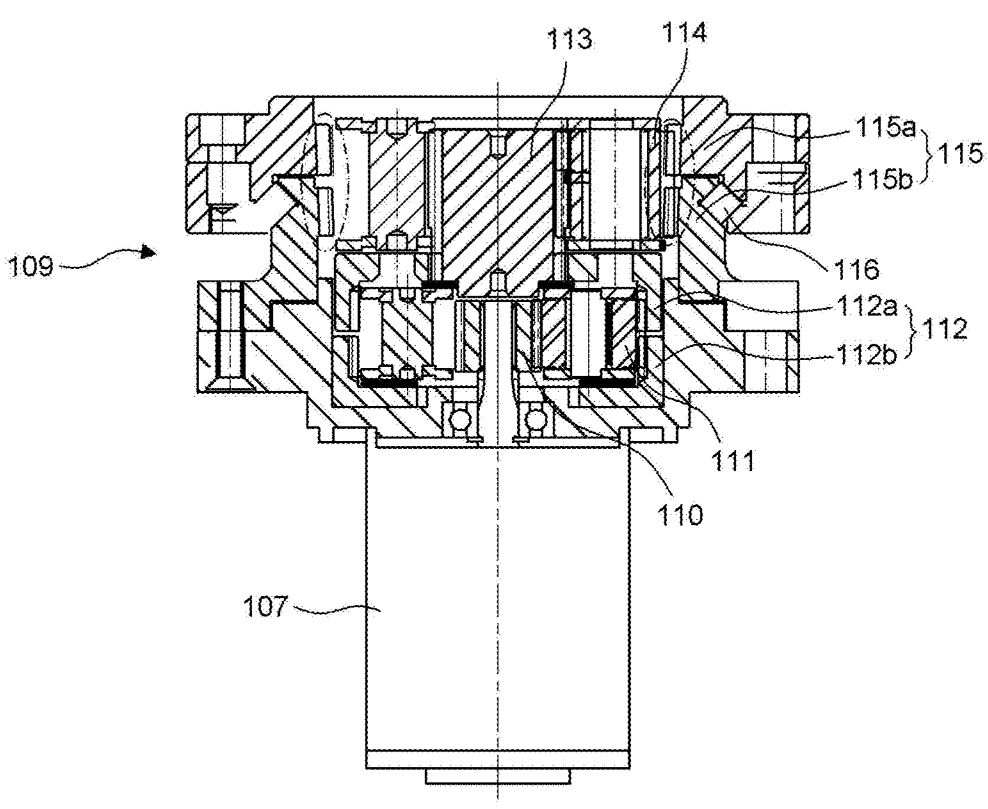

As another modification, as shown in FIG. 7, the inclined teeth forming the tapered structures are formed only on the inner peripheral surface of the second ring gear 115, and the second sun gear 113 and the second PL gears 114 have teeth without the tapered structure.

Figure 8:
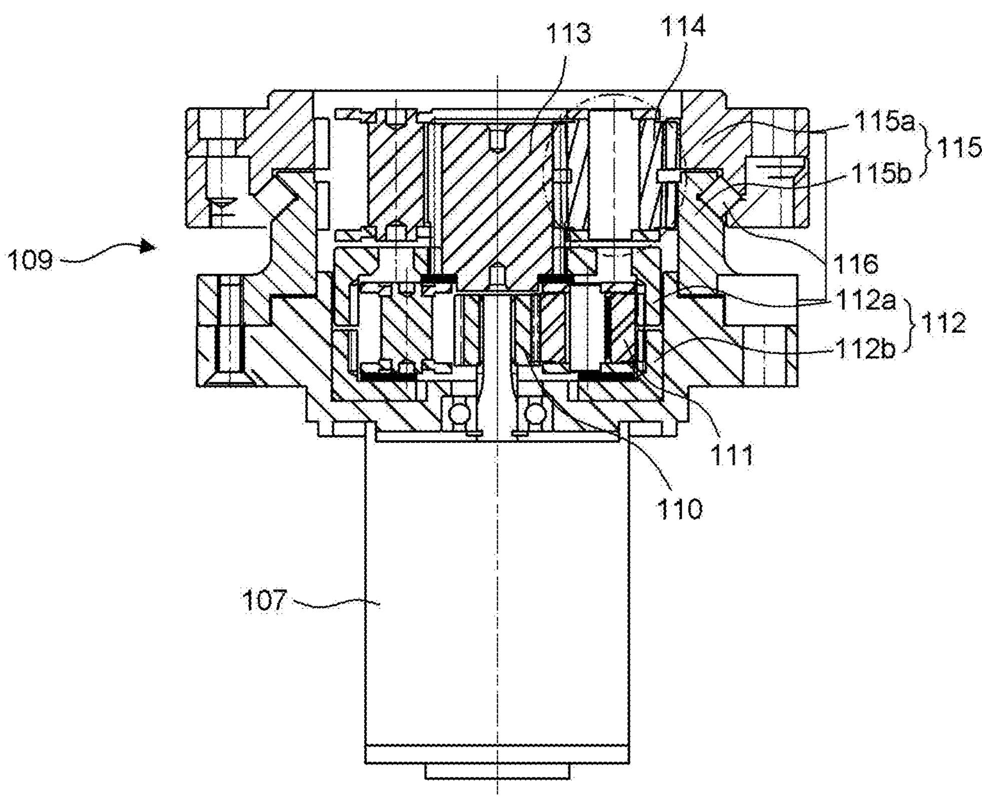

As another modification, as shown in FIG. 8, the inclined teeth forming the tapered structures are formed only on the outer peripheral surfaces of the second PL gears 115, and the second sun gear 113 and the second ring gear 115 have teeth without the tapered structure.

The drive motor 107 is preferably fixed inside the second tubular body 106 to stand coaxially with the second tubular body 106 and provides the rotational force to the gear unit 109.

Referring again to FIG. 3, a first contact point 102, a second contact point 103, and a third contact point 104 are installed to transmit power and/or signals at or around the coupling portion or at the contact portion of the first tubular body 101 and the second tubular body 106. Although not shown in the drawings, according to a modified example of the present invention, a rotating device having more than three contact points may be provided.

The first contact point 102 and the second contact point 103 are, respectively, conductor rings 102*a*, 103*a* fixed to be substantially connected to the second tubular body 106, and conductor blocks 102*b*, 103*b* that slide and continuously maintain contact with upper surfaces of the conductor rings 102*a*, 103*a* during relative rotation between the first tubular body 101 and the second tubular body 106. The conductor ring 102*a* and the conductor block 102*b* form a pair of contact point, and the conductor ring 103*a* and the conductor block 103*b* form a pair of contact point. The conductor ring 102*a* of the first contact point 102 and the conductor ring 103*a* of the second contact point 103 are arranged concentrically with each other. One of the first contact point 102 and the second contact point 103 becomes a negative electrode terminal and the other becomes a positive electrode terminal. Among the plurality of solar panels 15*a*, both ends of the entire output section are connected to the first contact point 102 and the second contact point 103, respectively. The power output through the first contact point 102 and the second contact point 103 is supplied to a power generation inverter 108 and used for power generation.

The third contact point 104 has a conductor ring 104*a* fixed to the rotating part of the gear unit 109 above the first contact point 102 and the second contact point 103 and rotated integrally with the first tubular body 101, and a conductor block 104*b* that slides and maintains contact with the lower surface of the conductor ring 104*a* during relative rotation between the first tubular body 101 and the second tubular body 106. The conductor ring 104*a* and the conductor block 104*b* form a pair of contact points. The third contact point 104 is electrically connected to the positive electrode terminal drawn from some output sections (e.g., an output terminal of one solar panel 15*a*) among the plurality of solar panels 15*a* forming the solar panel array 15. The power output through the third contact point 104 is used as a power source for driving the drive motor 107 and a predetermined PCB. The third contact point 104 is disposed relatively inside in a radial direction from the rotation shaft of the rotating device, that is, close to the driving motor 107 compared to the second contact point 103 so that it supplies power to the driving motor 107 and the PCB.

The first contact point 102 is preferably used as a common negative electrode terminal for the second contact point 103 and the third contact point 104. Of course, the electrical polarity given to the first contact point 102 to the third contact point 104 is not limited to the above-described embodiment and may be variously modified.

The solar rotating device 100 having the above configurations provides rotational force of the drive motor 107 to the gear unit 109 to rotate the first tubular body 101, thereby slowly rotating the solar panel array 15 fixed at an upper end of the first tubular body 101. The first tubular body 101 rotates with respect to the second tubular body 106 fixed to the pole 10 while stably supporting the solar panel 15*a*. A bearing is interposed between the first tubular body 101 and the second tubular body 106, so that structurally stable and smooth rotation can be achieved. It is desirable that a path along which the solar panel 15*a* rotates is set to provide sufficient exposure to the sun as much as possible, taking into account an amount of sunlight. If the solar panel 15*a* is rotated at a constant speed for a set period of time, even if a solar tracking device having complex structure is not used additionally, the solar power generation power amount is higher than when the solar panel 15*a* is left stationary to face one side.

Additionally, in the present invention, in addition to the solar panel array 15, a lifting type lighting unit and a lifting type CCTV camera unit can be installed. In this case, a drum built into a main body of each unit is rotated in a forward rotational direction to wind a first and second lifting ropes upwardly to couple the lighting unit and the CCTV camera unit with each main body located on the upper part of the pole 10, and then an upper and lower contact parts built into each main body contact each other to provide power to the lighting unit and the CCTV camera unit. Here, power for driving the lighting unit and the CCTV camera unit may be provided through, for example, the first contact point.

In the solar rotating device 100 according to the present invention, when the driving motor 107 is operated, the rotational force rotates the first tubular body 101 through the gear unit 109, so that the solar panel array slowly rotates. The first tubular body 101 rotates with respect to the second tubular body 106 fixed to the pole while stably supporting the solar panel array.

The gear unit 109 is composed of a planetary gear set including a first planetary gear set and a second planetary gear set, and reduces the rotational force of the drive motor 107 and outputs it to the first tubular body 101. The first tubular body 101 rotates integrally with the solar panel array 15 fixed to its upper surface.

The rotational force of the drive motor 107 is sequentially transmitted to the first planetary gear set and the second planetary gear set. When the second planetary gear set rotates, a predetermined clearance required for smooth rotation is secured on the gear contact surfaces of the second sun gear 113, the second PL gear 114, and the second ring gear 115, and when the rotation ends, as the gears return to their original positions by their own weight, they come into close contact with each other due to the tapered structures, preventing unnecessary backlash from occurring. Here, most preferably, the tapered structures are formed in all of the second sun gear 113, the second PL gear 114, and the second ring gear 115, but the effect of reducing an occurrence of unnecessary backlash is achieved if the tapered structures are formed only in the second PL gear 114 and the second ring gear 115.

The assembly combining the assembly of the first tubular body 101 and the second tubular body 106 to the solar panel 15*a* transmits rotational force more stably compared to existing technologies that simply connect the rotation shaft of the drive motor to the solar panel to rotate it since the diameter of the first tubular body 101 and the tubular body 106 are significantly larger compared to the diameter of the rotation shaft of the drive motor 107. That is, even if an external force such as vibration generated from the drive motor or wind is applied, the rotational force of the drive motor can be transmitted to the solar panel 15*a* without error.

Although the present invention has been described above with limited examples and drawings, the present invention is not limited thereto, and of course, various modifications and variations are possible within the scope of equivalence of the patent claims and the technical idea of the present invention.

INDUSTRIAL APPLICABILITY

When applying the present invention, solar power generation is generated with high efficiency by stably rotating the solar panel installed on the top of the pole.

What is claimed is:

1. A solar rotating device with anti-shaking structure installed on an upper end of a pole and rotating a solar panel array, the solar rotating device with anti-shaking structure comprising:

a first tubular body connected to the solar panel array;

a second tubular body coupled to a lower part of the first tubular body and fixed to the upper end of the pole;

a gear unit including at least two planetary gear sets and transmitting a reduced rotational force to the first tubular body; and a drive motor fixed to an inside of the second tubular body to provide the rotational force to the gear unit;

wherein the gear unit comprises, a first planetary gear set including a first sun gear that receives the rotational force generated by the drive motor, a plurality of first PL gears arranged at predetermined intervals-around the first sun gear to be engaged to the first sun gear, and a first ring gear disposed and engaged outside of the plurality of first PL gears; and a second planetary gear set disposed at a next stage of the first planetary gear set to receive the rotational force, and including a second sun gear, a plurality of second PL gears disposed and engaged at predetermined intervals around the second sun gear, and a second ring gear engaged outside of the plurality of second PL gears and outputting a reduced rotational force to the first tubular body;

wherein inclined teeth are formed on peripheral surfaces of all of the second PL gear and the second ring gear to have tapered structures, wherein the second sun gear has a cross section with a narrow upper part and a wide lower part, the second PL gears have a cross section with a wide upper part and a narrow lower part, an inner diameter of an upper part of the second ring gear is wider than an inner diameter of a lower part of the second ring gear to correspond to an inclined surface of the second PL gears, wherein the plurality of second PL gears move slightly upward by the rotational force, so that a predetermined clearance is secured on the gear contact surfaces during rotation, and when the rotation ends, the tapered structure allows the gear contact surfaces to closely engaged with each other to prevent backlash.

2. The solar rotating device with anti-shaking structure according to claim 1, wherein when the rotation ends, force is applied to the plurality of second PL gears due to their own weight in a direction in which they are inserted between the second sun gear and the second ring gear.

3. The solar rotating device with anti-shaking structure according to claim 1, wherein the first ring gear and the second ring gear are each composed of an assembly of an upper ring gear and a lower ring gear.

4. The solar rotating device with anti-shaking structure according to claim 1, wherein the first ring gear and the second sun gear are connected, or the first ring gear and a portion of a carrier of the second PL gear is connected to transmit the rotational force from the first planetary gear set to the second planetary gear set.

5. A multi-stage composite gear assembly used in a solar rotating device that rotates a solar panel array, the multi-stage composite gear assembly comprising:

a first planetary gear set comprising a first sun gear that receives a rotational force generated from a drive motor, a plurality of first PL gears arranged at predetermined intervals-around the first sun gear to be engaged to the first sun gear, and a first ring gear disposed and engaged outside of the plurality of first PL gears;

a second planetary gear set disposed at a next stage of the first planetary gear set to receive the rotational force, and comprising a second sun gear, a plurality of second PL gears disposed and engaged at predetermined intervals around the second sun gear, and a second ring gear engaged outside of the plurality of second PL gears and outputting a reduced rotational force;

wherein inclined teeth are formed on peripheral surfaces of all of the second PL gear and the second ring gear to have a tapered structure, wherein the second sun gear has a cross section with a narrow upper part and a wide lower part, the second PL gears have a cross section with a wide upper part and a narrow lower part, an inner diameter of an upper part of the second ring gear is wider than an inner diameter of a lower part of the second ring gear to correspond to an inclined surface of the second PL gears, wherein the plurality of second PL gears move slightly upward by the rotational force, so that a predetermined clearance is secured on the gear contact surfaces during rotation, and when the rotation ends, the tapered structure allows the gear contact surfaces to closely engaged with each other to prevent backlash.

* * * * *